(12) United States Patent
Fox et al.

(10) Patent No.: US 9,398,743 B1
(45) Date of Patent: *Jul. 26, 2016

(54) ELECTRIC MOTOR

(71) Applicant: Hydro-Gear Limited Partnership, Sullivan, IL (US)

(72) Inventors: Ivan E. Fox, Mattoon, IL (US); Christopher K. Wyatt, Oneco, FL (US); Jim Hendershot, Venice, FL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 376 days.

This patent is subject to a terminal disclaimer.

(21) Appl. No.: 14/069,775

(22) Filed: Nov. 1, 2013

Related U.S. Application Data

(60) Continuation of application No. 13/554,815, filed on Jul. 20, 2012, now Pat. No. 8,575,800, which is a division of application No. 12/684,617, filed on Jan. 8, 2010, now Pat. No. 8,227,948.

(60) Provisional application No. 61/143,612, filed on Jan. 9, 2009.

(51) Int. Cl.
*A01D 34/03* (2006.01)
*A01D 69/02* (2006.01)
*H02K 5/04* (2006.01)
*H02K 7/00* (2006.01)
*A01D 101/00* (2006.01)

(52) U.S. Cl.
CPC ............. *A01D 69/02* (2013.01); *A01D 34/03* (2013.01); *H02K 5/04* (2013.01); *H02K 7/003* (2013.01); *A01D 2101/00* (2013.01)

(58) Field of Classification Search
USPC .......... 56/14.7, 15.1, 17.5; 310/75 R, 66, 89, 310/157; 279/8, 141
See application file for complete search history.

(56) References Cited

U.S. PATENT DOCUMENTS

| | | | |
|---|---|---|---|
| 1,427,859 A | 9/1922 | Schmidt |
| 1,727,922 A | 9/1929 | Adams |
| 1,792,044 A | 2/1931 | Seyfried |
| 2,572,042 A | 10/1951 | Martin |
| 2,650,316 A | 8/1953 | Johns' et al. |
| 2,804,555 A | 8/1957 | Black et al. |
| 3,158,768 A | 11/1964 | Schonwald |
| 3,161,794 A | 12/1964 | Lindgren |

(Continued)

OTHER PUBLICATIONS

Permanent Magnet Synchronous Motor, Nov. 14, 2008, p. 1, http://www.freescale.com/webapp/sps/site/overview.jsp?nodeID=02430ZnQXGrrIPZL81.

(Continued)

*Primary Examiner* — Burton Mullins
(74) *Attorney, Agent, or Firm* — Neal, Gerber & Eisenberg LLP

(57) ABSTRACT

An electric motor includes an upper housing, a lower housing including a flange for mounting the upper housing thereon and a cone-shaped portion extending away from the flange and the upper housing. The electric motor further includes a stator assembly formed of a first core having a first height and fitted into the upper housing, a rotor assembly rigidly joined to a shaft to rotate therewith within the stator assembly and formed of a second core having a second height, and a hub connected to a lower end of the shaft to rotate therewith in relation to the cone-shaped portion. The hub is configured to secure an operable implement to the electric motor. The second height is greater than the first height.

20 Claims, 12 Drawing Sheets

(56) References Cited

U.S. PATENT DOCUMENTS

| | | | |
|---|---|---|---|
| 3,275,863 A | 9/1966 | Fodor | |
| 3,349,478 A | 10/1967 | DeJean | |
| 3,528,670 A | 9/1970 | Wale | |
| 3,564,824 A | 2/1971 | Tygh, Jr. | |
| 3,617,786 A | 11/1971 | Stielper | |
| 3,703,654 A | 11/1972 | Karubian | |
| 3,720,914 A | 3/1973 | Hallerback | |
| 4,017,964 A | 4/1977 | Schulte et al. | |
| 4,064,680 A | 12/1977 | Fleigle | |
| 4,325,664 A | 4/1982 | Mori | |
| 4,428,120 A | 1/1984 | Kobayashi et al. | |
| 4,628,220 A | 12/1986 | Flogvall | |
| 4,647,803 A | 3/1987 | VonderHeide | |
| 4,761,576 A | 8/1988 | Savage | |
| 4,993,290 A | 2/1991 | Obradovic | |
| 5,006,747 A | 4/1991 | Stewart | |
| 5,086,245 A | 2/1992 | Sieja et al. | |
| 5,289,890 A | 3/1994 | Toyoda et al. | |
| 5,502,957 A * | 4/1996 | Robertson | A01D 34/6806 56/10.2 G |
| 5,787,693 A | 8/1998 | Dyke | |
| 5,934,051 A * | 8/1999 | Hahn | B60K 28/04 180/273 |
| 6,040,647 A | 3/2000 | Brown et al. | |
| D424,076 S | 5/2000 | Dibbern et al. | |
| 6,081,056 A | 6/2000 | Takagi et al. | |
| 6,359,344 B1 | 3/2002 | Klein et al. | |
| 6,516,908 B2 | 2/2003 | Tseng | |
| 6,604,591 B2 | 8/2003 | Bowen et al. | |
| 6,664,678 B2 | 12/2003 | Shimizu | |
| 6,727,620 B2 | 4/2004 | White et al. | |
| 6,849,977 B2 | 2/2005 | Walther et al. | |
| 6,853,105 B2 | 2/2005 | Nakano et al. | |
| 6,853,107 B2 | 2/2005 | Pyntikov et al. | |
| 6,946,762 B2 | 9/2005 | Rinholm et al. | |
| 6,952,064 B2 | 10/2005 | Hiwaki et al. | |
| 7,024,842 B2 * | 4/2006 | Hunt | A01D 34/008 56/6 |
| 7,161,323 B2 | 1/2007 | Ajima et al. | |
| 7,345,395 B2 | 3/2008 | Imai et al. | |
| 7,355,310 B2 | 4/2008 | Kashihara et al. | |
| 7,372,183 B2 | 5/2008 | Sasaki et al. | |
| 7,468,568 B2 | 12/2008 | Naito et al. | |
| 8,227,948 B1 * | 7/2012 | Fox | H02K 1/06 310/50 |
| 8,575,800 B1 * | 11/2013 | Fox | H02K 1/06 279/141 |
| 2005/0046373 A1 * | 3/2005 | Aldred | A47L 9/009 318/580 |
| 2006/0059880 A1 * | 3/2006 | Angott | A01D 34/008 56/10.2 A |
| 2006/0284581 A1 | 12/2006 | Mullin et al. | |
| 2008/0100238 A1 | 5/2008 | Shaw | |
| 2008/0121443 A1 | 5/2008 | Clark et al. | |
| 2008/0135313 A1 | 6/2008 | Onderko et al. | |
| 2008/0234096 A1 | 9/2008 | Joshi et al. | |
| 2009/0000839 A1 | 1/2009 | Ishii et al. | |
| 2009/0127972 A1 | 5/2009 | Ishida et al. | |
| 2011/0120073 A1 | 5/2011 | Flanary | |

OTHER PUBLICATIONS

Electric Motor, Wikipedia, Nov. 14, 2008, pp. 1-8, http://en/wikipedia.org/wiki/Electric_motor.

Brushless DC Electric Motor, Wikipedia, Nov. 14, 2008, pp. 1-5, http://en.wikipedia.org/wiki/Brushless_DC_motor.

Induction Motor, Wikipedia, Nov. 14, 2008, pp. 1-5, http://en/wikipedia.org/wiki/Induction_motor.

Kondo, Minoru, Application of Permanent Magnet Synchronous Motor to Driving Railway Vehicles, Railway Technology Avalanche, No. 1, Jan. 1, 2003, p. 6.

* cited by examiner

ELECTRIC MOTOR

CROSS-REFERENCE

This application is a continuation of U.S. patent application Ser. No. 13/554,815 filed on Jul. 20, 2012, which is a divisional of U.S. patent application Ser. No. 12/684,617 filed on Jan. 8, 2010, now U.S. Pat. No. 8,227,948, which claims priority to U.S. Provisional Patent Application Ser. No. 61/143,612 filed on Jan. 9, 2009, all of which are hereby incorporated herein in their entirety.

TECHNICAL FIELD

This disclosure is generally related to electric motor construction, and more particularly, to electric motors employed in utility vehicles and walk-behind power equipment, such as lawn and garden tractors, mowers, and the like. The disclosed motors may be used in connection with primary electric drive systems or auxiliary drive systems that drive auxiliary power devices and various work implements of the vehicle or equipment.

BACKGROUND OF THE INVENTION

Utility vehicles, such as lawn and garden tractors and mowers, have generally relied upon internal combustion engines as the prime mover transferring power through mechanical linkages (gearing or belts), hydrostatic drive(s) or other similar devices to propel or drive the vehicle. A deck of the utility vehicle is typically used to employ an auxiliary system, such as cutting blades of a lawn tractor. The majority of commercial and consumer mowers employ a deck (auxiliary) drive system using belts and pulleys driven by an engine typically with an electric clutch/brake to stop or drive the deck system. Other variants take the form of a power take off (PTO) shaft in combination with pulleys and belts to drive multiple blade spindles in larger decks or to individually drive spindles with hydraulic motors in multiple deck or reel versions.

Utility vehicles and other equipment incorporating electric motor(s) as primary mover(s) have emerged as viable alternatives to internal combustion utility vehicles and equipment, particularly due to rising oil and fuel prices. Consumers also want products with increased comfort and increasing versatility in smaller packages. Electric vehicles offer considerable advantages for reduction of emission of noise and pollution, as well as improved operator controls. These vehicles, which typically include one or more work accessories or auxiliary systems incorporating additional electric motors, also incorporate various forms and levels of control, depending upon the vehicle type, drive type, functional features, and other design aspects to ensure safe operation. With the advancement of these vehicle types and their functionality, various problems and needs have arisen in their design, operation, and functionality.

Due to their relative high power capacity, three-phase AC electric motors are typically used in utility vehicles to drive axle shafts or work implements and are powered by a power source, such as an on-board battery pack or array. AC induction motors, and Permanent Magnet Synchronous (PMS) Motors in particular, would be advantageous in utility vehicle applications due to their power capacities and efficiencies in their physical constructions. PMS motors have the ability to rapidly accelerate and decelerate high-inertial loads, which minimizes processing time. Both AC induction motors and PMS motors utilize a stator assembly with specially distributed phase windings connected in either a "wye" or "delta" fashion. Stator laminations minimize airgap reluctance, facilitating a high level of flux coupling between the rotor and stator. The magnetic circuit of the PMS motor is similar to an AC induction motor. The fundamental difference between PMS and AC induction is how magnetic poles are produced on the rotor. An AC induction motor induces magnetic poles that travel along the rotor's surface, a process that requires a small airgap and consumes a component of applied motor power. Conversely, PMS motors create stationary poles on the rotor using fixed high-energy magnets. Permanent magnet rotor construction supports larger airgaps, reduces the rotor's inertia, and increases motor efficiency by eliminating power consumption associated with AC induction. Due to these advantages, PMS motors offer significant potential advantages in utility vehicle applications.

Regardless of the motor type, however, implementation to power auxiliary functions of utility vehicles presents a variety of problems. These vehicles often operate in harsh environments that could damage the motor if it is not adequately protected. Furthermore, there is a problem in balancing the need for powerful electric motors with accommodating these powerful motors in a vehicular application, which typically places a premium on reducing size and weight of components. The physical dimensions and overall size of standard off-the-shelf motors that have the required power capacities many times present clearance problems for the vehicle designer or obstructions to the vehicle operator. Presently available off-the-shelf motor designs that provide sufficient torque are often too large and/or too heavy to be practical for application to a utility vehicle. Additionally, they may not be configured in a suitable manner to drive the required auxiliary implement(s). With the advancement of electric-drive utility vehicles and their functionality, the aforementioned problems, as well as other problems and needs have arisen. This disclosure is directed to addressing these and other problems in the general area of improved electric motor design and drive configurations for utility vehicle applications.

SUMMARY OF THE INVENTION

The present invention comprises an electric motor for use in a utility vehicle or other power equipment, and in a particular embodiment, an electric motor for use in performing auxiliary work functions of a utility vehicle. These motors are referred to herein as "auxiliary motors" or "deck motors," and it will be understood that these terms may be used interchangeably. In a particular embodiment, an electric motor design configuration suitable for driving one or more mowing blades is disclosed. The electric motor is shown in use with an electric lawn mower. While shown and described in reference to utility vehicles, it will be apparent to those skilled in the art that the electric motor defined herein could be utilized in a variety of other configurations or applications that require translation of electricity to mechanical energy from a compact and efficient motor as shown.

While not limited to a specific type of motor, the deck motors shown in the illustrated vehicle configurations and component drawings are AC permanent magnet synchronous (PMS) motors. Aspects of the present invention may be applied to other motor types as well, including brushless direct current (BLDC), AC synchronous, AC induction, integrated permanent magnet (IPM), switched reluctance, stepper, or slotless brushless type permanent magnet motors.

Features of the disclosed electric motor include a 12-slot stator construction with a 10-pole rotor having convex magnets. The stator comprises a lamination stack that is skewed around the stator axis resulting in a smoother flux-density curve and improved efficiency. Motor winding path, quantity of wraps and wire connections are specified. Each motor comprises an attached terminal box designed to provide a low motor height profile, and an integrally formed nose cone on the motor lower housing adapted for connection with the various driven implements. A single cupped and finned upper housing is provided for improved capability and reliability in rigorous turf applications.

The present invention provides an electric motor, which includes an upper housing, a lower housing including a flange for mounting the upper housing thereon and a cone-shaped portion extending away from the flange and the upper housing. The electric motor further includes a stator assembly formed of a first core having a first height and fitted into the upper housing, a rotor assembly rigidly joined to a shaft to rotate therewith within the stator assembly and formed of a second core having a second height, and a hub connected to a lower end of the shaft to rotate therewith in relation to the cone-shaped portion. The hub is configured to secure an operable implement to the electric motor. The second height is greater than the first height.

According to one aspect of the invention, an electric motor stator is provided which has a stator core having a plurality of teeth and a plurality of slots, each one of the slots formed between circumferentially adjacent teeth, and a plurality of winding pairs each associated with one of a plurality of power phases, each winding of the plurality of winding pairs wrapping a pair of adjacent teeth. For each winding pair, one of the windings wraps a first pair of adjacent teeth by (a) entering one of the slots situated adjacently to and circumferentially outside the first pair of adjacent teeth, (b) alternately wrapping each tooth of the first pair of adjacent teeth and (c) exiting through one of the slots situated between the first pair of adjacent teeth. The other one of the windings wraps a second pair of adjacent teeth by (d) entering one the slots situated between the second pair of adjacent teeth, (e) alternately wrapping each tooth of the second pair of adjacent teeth, and (f) exiting through one of the slots situated adjacently to and circumferentially outside the second pair of adjacent teeth.

According to another aspect of the invention, a method is provided for wiring a stator of an electric motor. The stator includes a stator core having a plurality of teeth and a plurality of slots, each one of the slots formed between circumferentially adjacent teeth, and a plurality winding pairs each associated with one of a plurality of power phases, each winding of the plurality of winding pairs wrapping a pair of adjacent teeth. The method includes wrapping a first pair of adjacent teeth by one of the windings of each winding pair by (a) entering one of the slots situated adjacently to and circumferentially outside the first pair of adjacent teeth, (b) alternately wrapping each tooth of the first pair of adjacent teeth, and (c) exiting through one of the slots situated between the first pair of adjacent teeth. The method further includes wrapping a second pair of adjacent teeth by the other one of the windings of each winding pair by (d) entering one the slots situated between the second pair of adjacent teeth, (e) alternately wrapping each tooth of the second pair of adjacent teeth, and (f) exiting through one of the slots situated adjacently to and circumferentially outside the second pair of adjacent teeth.

A better understanding of the objects, advantages, features, properties and relationships of the invention will be obtained from the following detailed description and accompanying drawings which set forth an illustrative embodiment and is indicative of the various ways in which the principles of the invention may be employed.

DETAILED DESCRIPTION OF THE DRAWINGS

Figure 1:
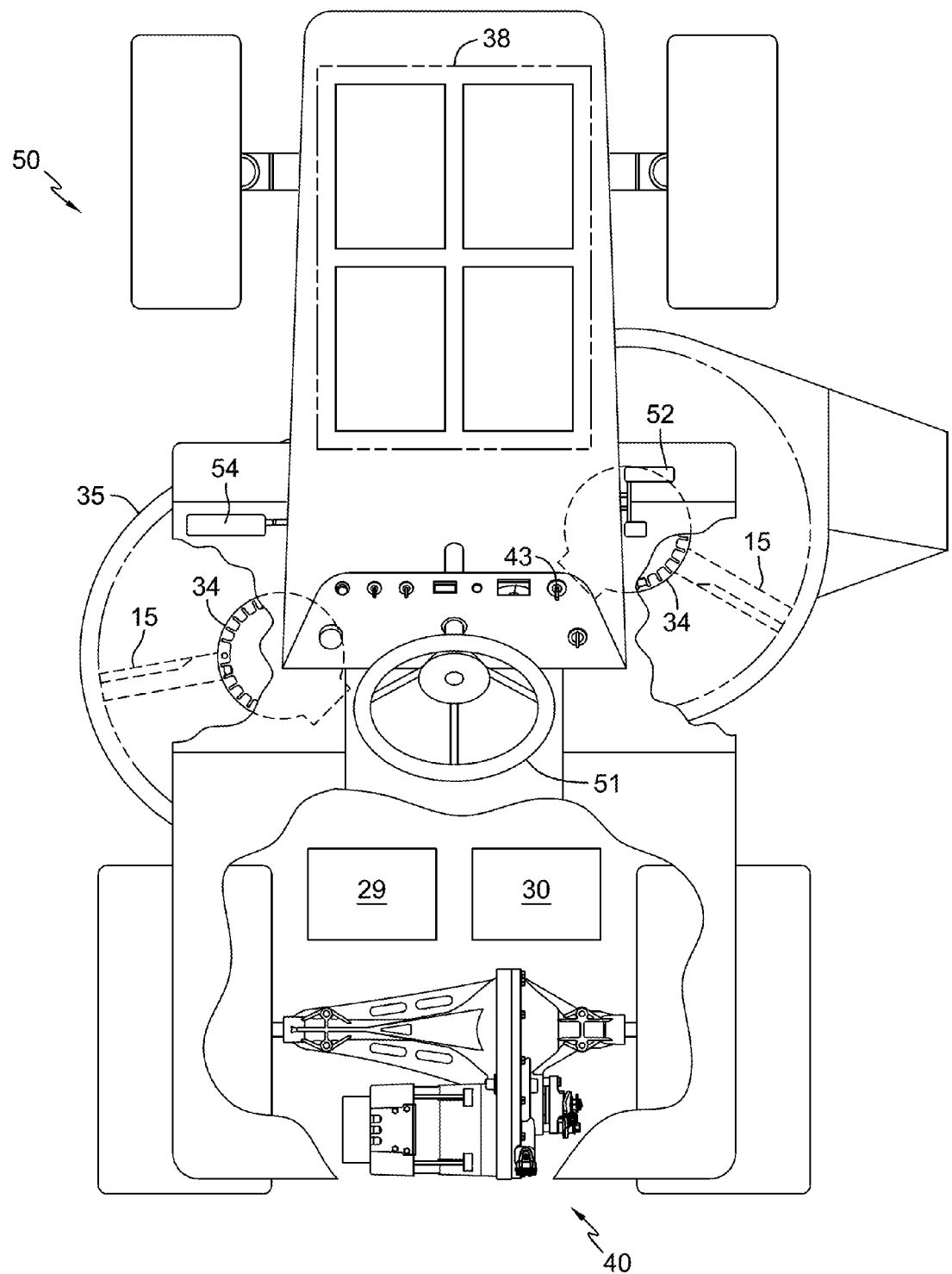
FIG. 1 is a top plan view of a first configuration of a utility vehicle incorporating an embodiment of the present invention.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the present invention as taught herein and understood by one of ordinary skill in the art.

FIG. 1 shows an exemplary utility vehicle in the form of a mowing vehicle 50 incorporating a plurality of electric motors. Vehicle 50 has a single transaxle 40 for driving both rear wheels. Transaxle 40 is preferably an electric transaxle incorporating one or more electric drive motors. Vehicle 50 includes a traction controller 29, an auxiliary motor controller 30, an electric power supply 38, an auxiliary mowing deck 35, and two deck motors 34. The electrical power supply 38 is generically represented as a 48-volt power supply. However, other voltage configurations are contemplated as well. Operator controls on vehicle 50 comprise a traditional mechanical steering wheel 51, a rocker style accelerator pedal 52, and a brake pedal 54, as well as an auxiliary control (PTO) switch 43 to initiate or terminate power to deck motors 34. Though shown in specific locations on the representative vehicle of FIG. 1, the traction controller 29, auxiliary motor controller 30 and the electric power supply 38 may be affixed to other suitable locations on the subject vehicle. These components are connected by electrical wiring and/or wiring harnesses, many suitable variations of which are readily available, well-known, and therefore not shown in the interest of maintaining illustrative clarity. The fraction and auxiliary motor controllers receive and process input signals and generate output signals for the single transaxle 40 and deck motors 34, respectively.

In vehicle 50, each deck motor 34 is attached to mowing deck 35 and respectively drive separate blades 15 suspended under mowing deck 35. It should be understood that any number of deck motors 34 may be employed depending on equipment requirements. Furthermore, it should also be understood that each deck motor 34 may drive one or more blades either directly via an output shaft or indirectly via an alternate transmitting means. These components and their connections will be described in further detail below. Though not a requirement, the terminal connection portions of each deck motor 34 (illustrated as a flat outcropping shown in phantom line in FIG. 1) is shown oriented approximately towards the center of the vehicle so as to better protect the terminal connections and any associated wiring from damage and reduce the opportunity for direct spray during washing of the utility vehicle.

It should be noted that the deck motors 34 may vary in size and/or output power depending on vehicle configuration and load requirements. For example, vehicle mowing speed, deck airflow characteristics, number of blades driven by a single motor, blade design, blade size and other such characteristics, all have an impact on deck motor load requirements. Additionally, although blade design is not specifically addressed herein, it is well known that blades and cutters are configured in numerous ways and, for the purpose of this disclosure, include various types of other known cutting devices, such as, for example, wire, cable, or string arrangements. Furthermore, other auxiliary equipment or desired applications also will alter motor load requirements. Therefore, it will be understood that the present invention is scalable and various embodiments incorporate motors of differing sizes amenable to package on a utility vehicle to meet these load requirements.

It should also be understood that any number of electric motors may be implemented in the utility vehicle 50 in connection with the primary drive system or to drive additional auxiliary work functions (blades, blowers, brooms, trimmer, auger, etc.) either directly or using belting and/or gearing arrangements. Accordingly, it will be understood that one or more of the motors described herein may be employed across numerous vehicle configurations to directly or indirectly drive a wide variety of mechanical implements.

As an exemplary embodiment in accordance with one or more principles of the present invention, the motor 34 will now be described in more detail, with reference to FIGS. 2, 3 and 4. The motor 34 in FIG. 2 includes an upper housing 56 and a lower housing 57. A terminal box assembly 80 is fixed to one side of the upper housing 56. The cup-shaped upper housing 56 includes a plurality of threaded cavities around its perimeter for attaching the lower housing 57 using a plurality of fasteners 58. In other embodiments, other known suitable methods of fastening upper housing 56 and lower housing 57 together are used. The lower housing 57 includes a mounting flange 47 and a bell nose cone 45 extending away from flange 47 and upper housing 56. Mounting flange 47 includes a plurality of holes 19a (shown best on FIG. 4) through which fasteners 58 extend to secure the upper and lower housings 56 and 57 together. Mounting flange 47 also includes a plurality of holes 19b around its perimeter for attaching motor 34 to mowing deck 35. In an alternative embodiment, flange 47 also includes countersink or counterbore features (not shown) to receive the heads of the housing fasteners 58 so flange 47 is flush-mounted to the upper surface of a mowing deck.

Together, the upper and lower housings 56 and 57 form a two-piece, sealed housing designed to facilitate service and assembly, as well as provide protection for the internal components of motor 34. Prior electric motor housing designs often utilized a three-piece housing construction consisting of a tube-shaped middle portion with a cap secured to each end. This configuration is generally known as "can construction" in the motor industry. The two-piece housing construction of the present invention provides for improved sealing and thermal conduction over such designs. The approximately central location of the plane of the mounting surface of flange 47 between the two ends of the axis of motor shaft 20 is particularly useful in achieving a low profile above the mounting surface, such as a mowing deck. The contact area of the circular mounting flange also helps to improve heat dissipation, utilizing the mounting surface as a heat sink. To further improve motor cooling, radial fins are included on the sides of upper housing 56. In the embodiment shown, both upper and lower housings 56 and 57 are cast aluminum. However, other materials such as steel or plastic, and other forming techniques, such as stamping or molding, are used in other embodiments.

Figure 2:
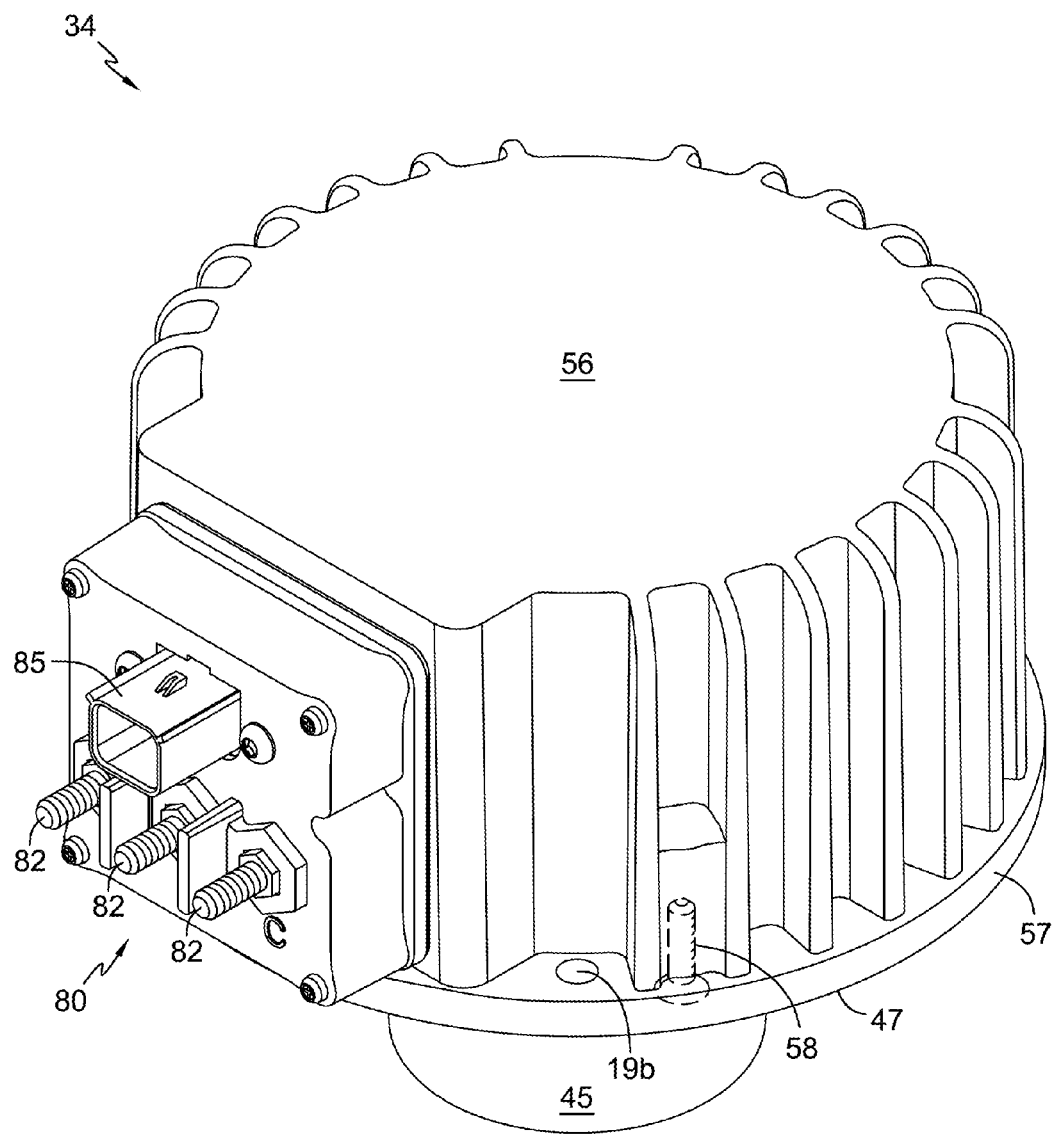
FIG. 2 is a perspective view of an embodiment of the present invention.
Figure 3:
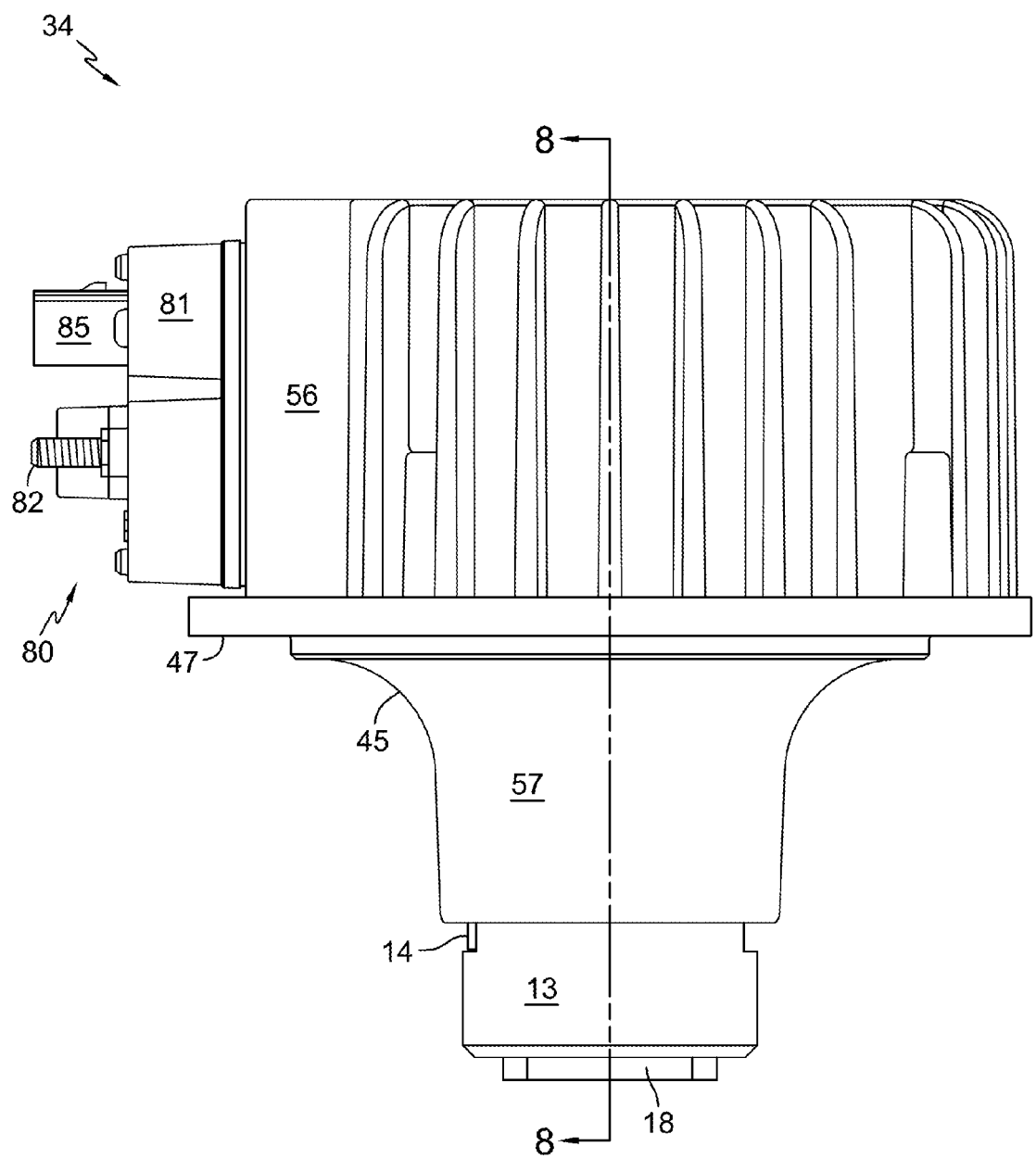
FIG. 3 is an elevation view comprising the embodiment shown in FIG. 2.

As shown in FIG. 2, the terminal box assembly 80 includes a wiring receptacle 85 and three terminal posts 82—one for each of the three power phases used to drive the motor 34 via the motor controller 30. The wiring receptacle 85 provides a plug-type connection for wiring used to convey thermal information from motor 34. In another embodiment (not shown), additional or other sensed information, such as motor speed or rotor position, is conveyed through a similar plug-type connection. In the embodiment shown, the terminal box assembly 80 is mounted on the side of upper housing 56 to achieve a low profile and efficient wiring routing between motor 34 and controller 30, for example. However, in alternative embodiments, the terminal box may be located on other surfaces of the motor 34. At its distal end, motor shaft 20 connects with a hub or adapter 13 (see FIGS. 3, 5 and 13) used to secure an operable implement to the motor so as to harness the mechanical energy it produces. This connection will be further explained below.

Figure 4:
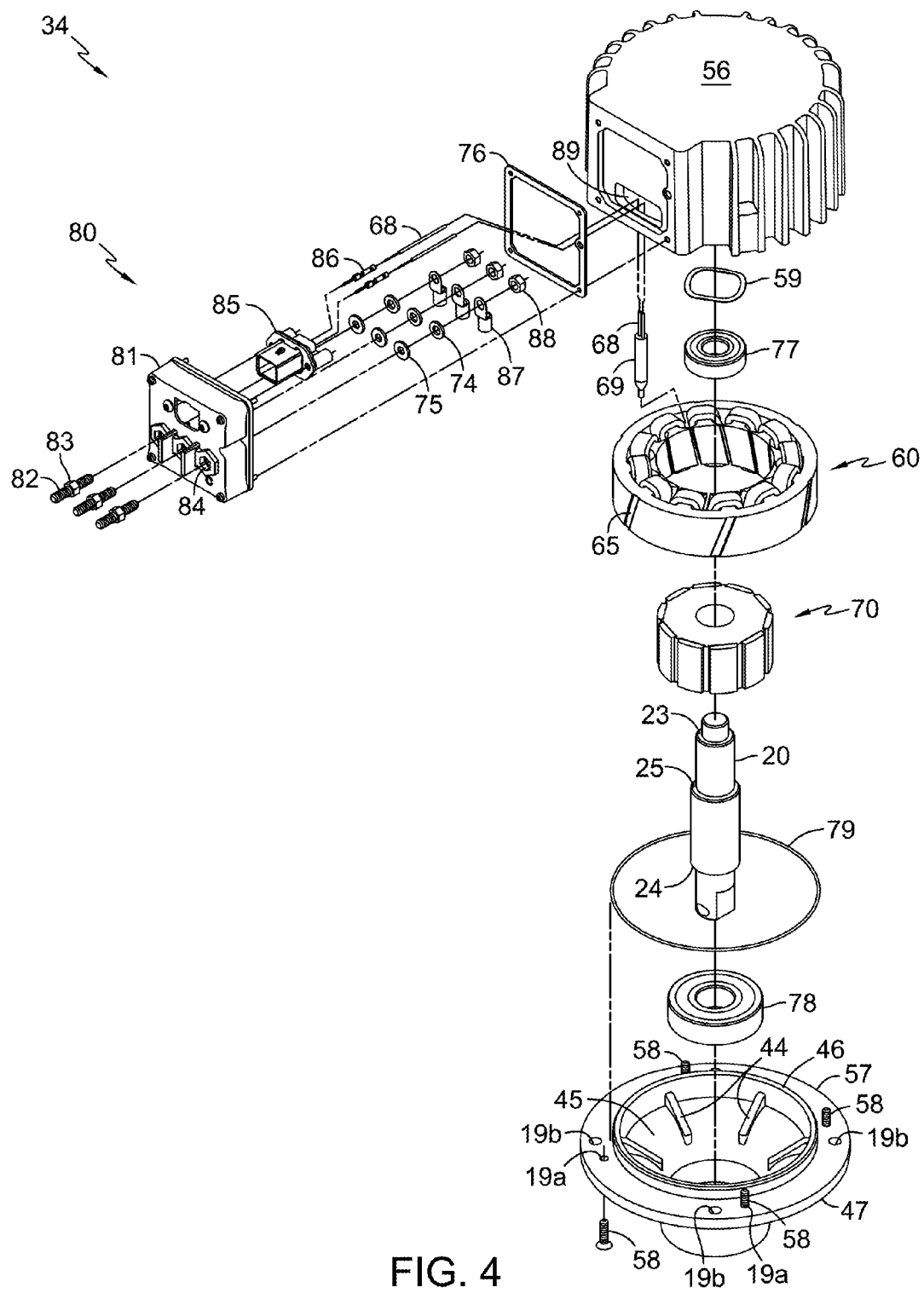
FIG. 4 is an exploded perspective view of the embodiment shown in FIG. 2.

FIG. 4 provides an exploded view showing the internal components of motor 34. In addition to the components described above, FIG. 4 illustrates additional components such as upper bearing 77, lower bearing 78, motor shaft 20, rotor assembly 70, stator assembly 60 and wave washer or spacer 59. These components are shown assembled in FIG. 5. Upper and lower bearings 77 and 78 are press-fit onto motor shaft 20. As shown, motor shaft 20 includes an upper land or shoulder 23 and a lower land or shoulder 24 to facilitate positioning of upper and lower bearings 77 and 78, respectively. The upper bearing 77 is slip-fit into a cylindrical pocket 48 formed within upper housing 56 and the lower bearing 78 is slip-fit into a cylindrical pocket 49 formed within lower housing 57. Thus, the upper and lower bearings 77 and 78 work together to position and support motor shaft 20 within the assembled deck motor housing, while allowing it free rotation about the motor shaft axis.

Figure 5:
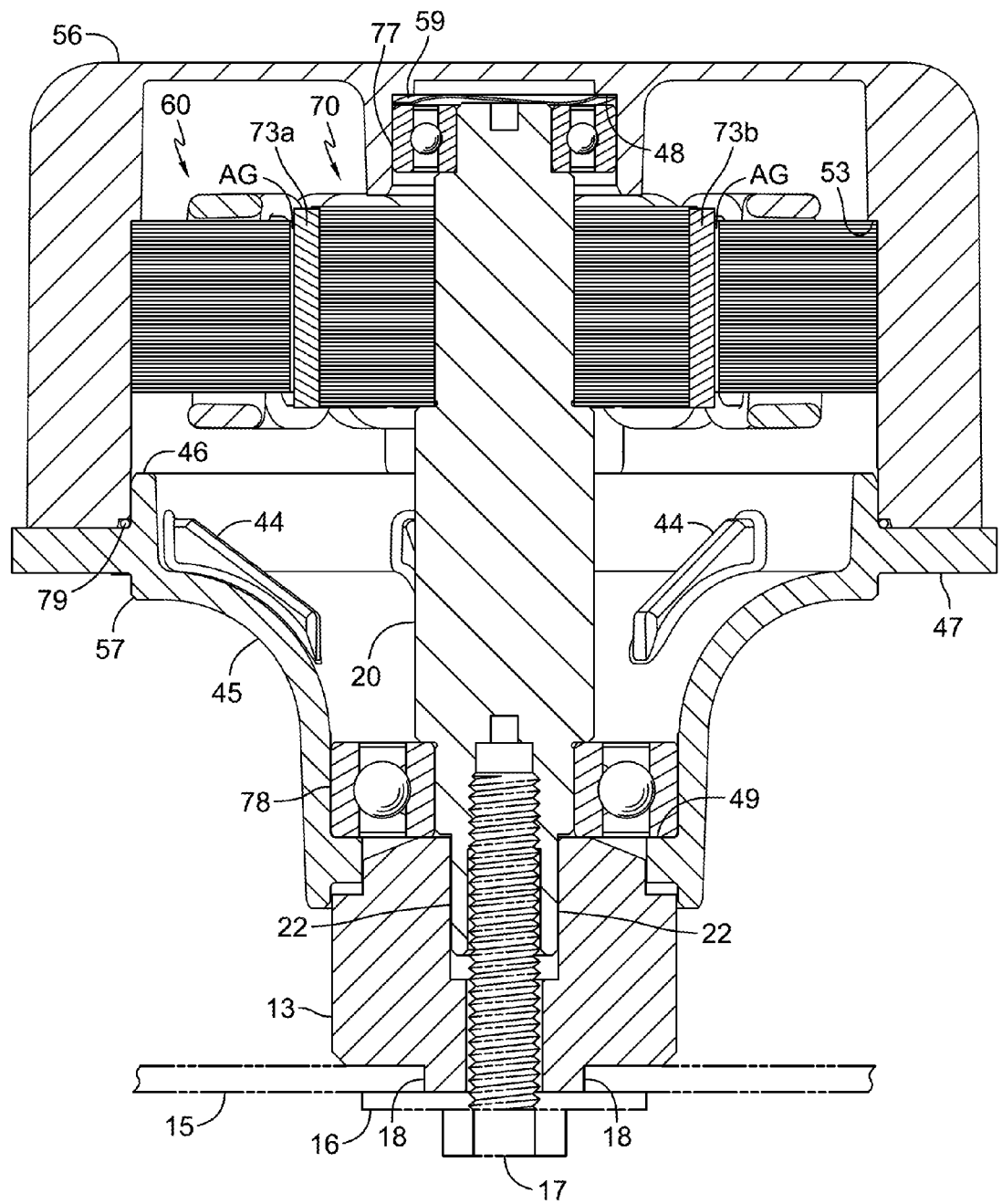
FIG. 5 is a cross-sectional view along the line 8-8 of FIG. 3, showing previously disclosed components assembled.

Upper bearing 77 is separated from contact with the inside upper surface of pocket 48 by a wave washer 59 so as to reduce axial endplay. Referring to FIG. 5, it will be seen that the rotor assembly 70 lamination stack height is greater than the stator assembly 60 lamination stack height (and the rotor magnets 73a and 73b extend above and below the stator assembly 60 lamination stack) in the illustrated embodiment to compensate for axial movement of rotor assembly 70 if wave washer 59 flexes. Upper bearing 77 and lower bearing 78 are of a well-known variety having an inner and outer ring or race separated by a plurality of ball bearings such that the inner race of each bearing can rotate relative to the outer race. In some embodiments, bearing 77 and/or 78 are of the sealed variety in order to help prolong bearing life by reducing contamination.

The motor shaft 20 also provides a middle land or shoulder 25 which is used to locate the rotor assembly 70. Thus, the rotor assembly 70 is supported by and fixed to the motor shaft 20, and rotates therewith. The rotor assembly 70 fits inside the stator assembly 60 with an appropriate air gap (labeled AG in FIG. 5) between the rotor and stator to allow for free rotation of rotor assembly 70 relative to stator assembly 60. Stator assembly 60 is press-fit into upper housing 56 against a land or shoulder 53 formed in the upper housing inner wall. This shoulder 53 properly positions stator assembly 60 within motor 34. Upper housing 56 is heated for expansion and stator assembly 60 cooled for contraction prior to fitting stator assembly 60 into position. When housing 56 cools, it then contracts, tightly gripping stator assembly 60. While the demonstrated embodiment provides these various formed lands or shoulders to aid in locating components and suggests press-fit and slip-fit connections, it will be understood that other embodiments may utilize other means, such as tab and slot joints or adhesives, to form a rigid joint or connection between motor shaft 20 and rotor assembly 70; between motor shaft 20 and bearings 77 and 78; between upper housing 56 and stator assembly 60; between upper housing 56 and upper bearing 77; and between lower housing 57 and lower bearing 78. A combination of joining means may also be employed in some embodiments, as needed, in order to ensure a secure joint between the respective aforementioned components. Furthermore, while motor shaft 20 must be of sufficiently rigid material to withstand the torsional load requirements of motor 34, it may be formed by various means of any suitable material, such as high strength steel.

Positioning the lower bearing 78 within pocket 49 of the lower housing 57 near the driven load helps place the radial load imposed by the mowing deck blades near the lower bearing 78, thereby improving static and dynamic loading on the bearing, which enhances the life of the bearing. Positioning the bearing in this manner also eliminates the possible need for a separate bearing external to the motor housing. As shown in FIGS. 4 and 5, the lower housing 57 includes a rim 46 and a plurality of ribs 44 that are formed in the housing. These features add strength and stability to motor 34. Rim 46 also enhances the seal between upper housing 56 and lower housing 57 by properly locating and containing housing seal 79 and providing an overlapping joint with upper housing 56. Seal 79 is an O-ring, but other types of seals are contemplated as well. It will be understood that the size, number of and/or positioning of the ribs 44, holes 19a, fasteners 58, and mounting holes 19b vary between embodiments and do not limit the design disclosed herein. Additionally, it is contemplated that in some embodiments, mounting holes 19b may be threaded to receive screws or bolts. Some embodiments may utilize locknuts or lock washers and nuts to secure screws or bolts. Other embodiments may utilize carriage bolts to prevent bolts from turning while tightening nuts. Still other embodiments may utilize other fastening methods, such as riveting, for example.

FIG. 4 also illustrates additional components of terminal box assembly 80, which include a terminal box 81, a seal or gasket 76, and three terminal posts 82, each having an integral nut 83, a flexible sealing washer 75, a rigid washer 74, an eyelet terminal 87 and a separate nut 88. Each integral nut 83 is seated in a mating recess 84 that is molded into terminal box 81. These mating recesses 84 help prevent rotation of the terminal posts 82 during tightening of the nuts 88 in assembly or service. Optionally, in lieu of nuts 83 and mating recesses 84, terminal posts or studs may be insert-molded as an integral part of terminal box 81. Inside the terminal box 81, each terminal post 82 first receives a flexible sealing washer 75 to assist in sealing the terminal box 81, a backup rigid washer 74 which prevents damage to and facilitates the sealing function of the flexible sealing washers 75, an eyelet terminal 87 which connects via wiring (not shown) to windings on stator assembly 60, which will be described in more detail below, and a separate nut 88 to secure the inside connection. The three electric power conducting wires (not shown) from a controller terminate with eyelet terminals (not shown, but similar to terminals 87) which each slip over one of the terminal posts 82 extending from the terminal box 81. In the illustrated embodiment, the posts 82 are physically labeled or otherwise marked A, B and C (or other typical convention) on both the inside and outside of the terminal box 81 to help ensure proper three-phase wire lead connections are made. The eyelet terminals on the power conducting wires from the controller are secured to the exterior of the terminal box 81 using nuts (not shown) and lock washers (not shown).

Finally, FIG. 4 illustrates the two-pin wiring receptacle 85 that fastens to the terminal box 81. Wiring receptacle 85 provides a plug connection on the outer surface of terminal box assembly 80 for connection to a controller (not shown). As shown, upper housing 56 provides an opening 89 through which wiring from stator 60 is routed for connection to wiring receptacle 85 and terminal posts 82. Additionally, the thermistor leads 68 extend through the opening 89 and terminate in pin terminals 86 that affix to the inside of wiring receptacle 85. Leads 68 provide temperature feedback to the motor controller 30. The other end of these leads is attached to a thermistor probe 69, which is positioned relative to the stator assembly 60 to provide the temperature readings. In another embodiment, a bi-metallic switch is used instead of thermistor probe 69. With the proper connections in place and the wiring receptacle 85 fastened to the terminal box 81, the terminal box 81 is secured against upper housing 56 and sealed by gasket 76 or another known sealing method. Terminal box 81 may be constructed of any material that meets IEC 529 protection rating IP 65 or equivalent. In other embodiments, terminal box 81 is integrally formed as part of the upper housing 56.

Figure 6:
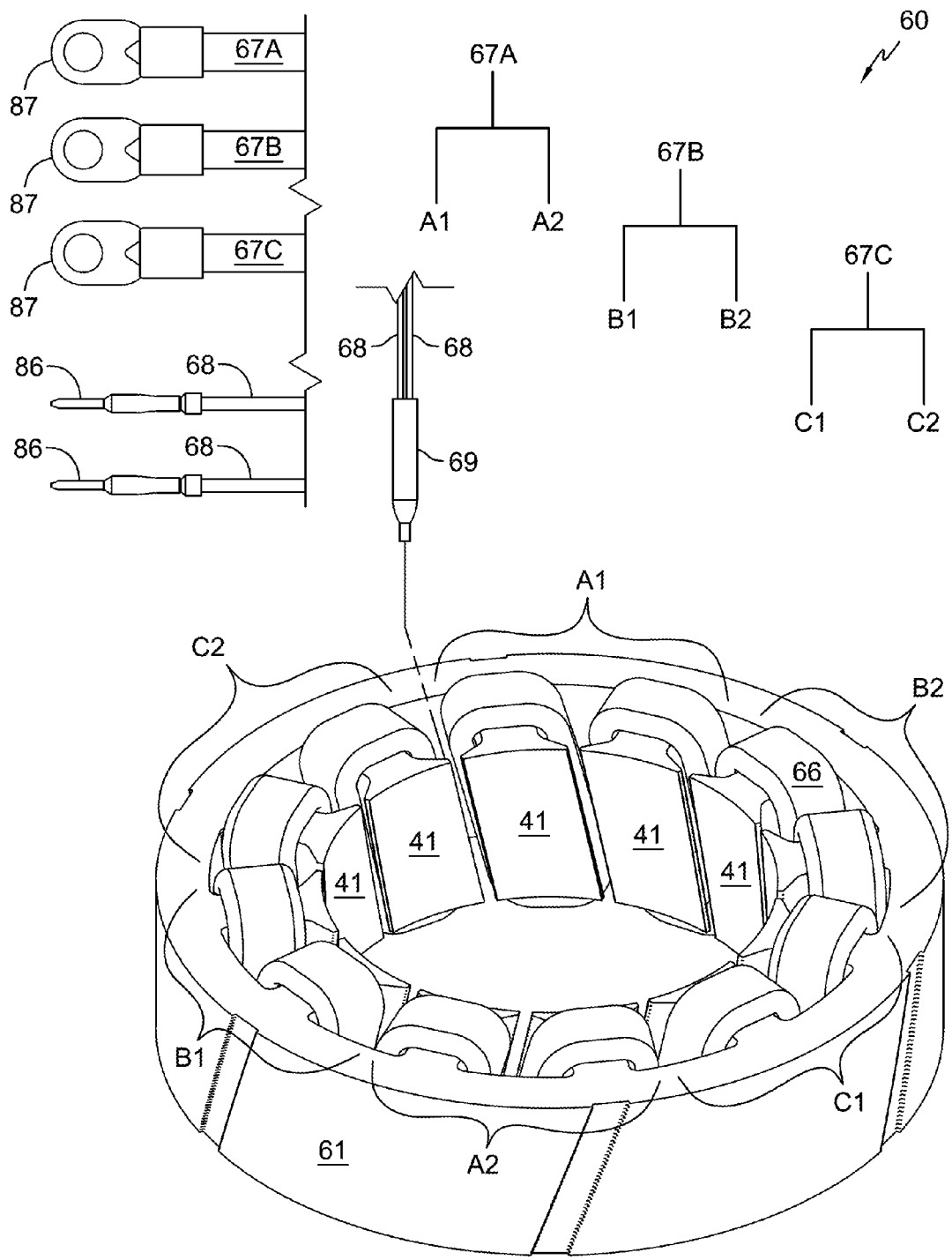
FIG. 6 is a perspective view of the stator core as shown in FIG. 4, combined with diagrammatic and 2-dimensional views showing the terminal leads, thermistor, and certain wiring details, in order to illustrate the stator assembly.

In FIG. 6, stator assembly 60 is shown as comprising a stator core 61 having twelve inward-facing teeth 41 around which are wrapped wires extending from the three eyelet terminals 87. Before entering the stator core 61, each of the three power conducting wires (labeled 67A, 67B, and 67C) splits into two separate lead wires (multi-strand conductors), forming six wire leads designated as A1, A2, B1, B2, C1 and C2. That is, as indicated by the diagram portion of FIG. 6, wire 67A splits into leads A1 and A2, wire 67B splits into leads B1 and B2, and wire 67C splits into leads C1 and C2. In the embodiment shown, each lead is a 21-strand, 25 American Wire Gage (25 AWG) or 0.45 mm conductor, however, other wire gages and strand counts can be used as desired to meet various specifications of the motor. Thus, when lead pairs A1 and A2 join together, they form the power conducting wire 67A having 42 strands. Power conducting wires 67B and 67C are formed in the same fashion, each having 42 strands, as well. Each of the six leads A1, A2, B1, B2, C1 and C2 wraps one of six pairs of stator teeth 41, thus forming the windings 66. The stator teeth 41 are shown as paired based on which lead wraps around them. Thermistor leads 68 connect to thermistor probe 69, as mentioned previously, which, in the embodiment shown, is inserted into the stator core between the winding pairs labeled A1 and C2.

Figure 7:
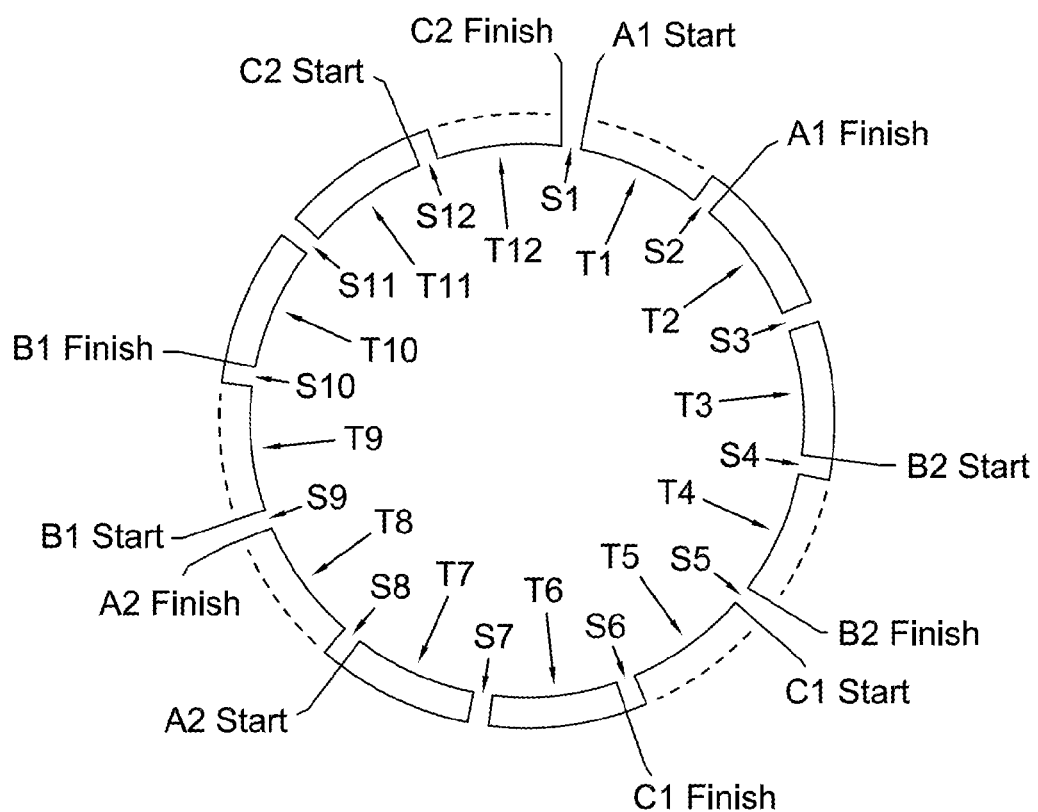
FIG. 7 is a winding diagram for the basic stator assembly shown in FIG. 9.
Figure 8:
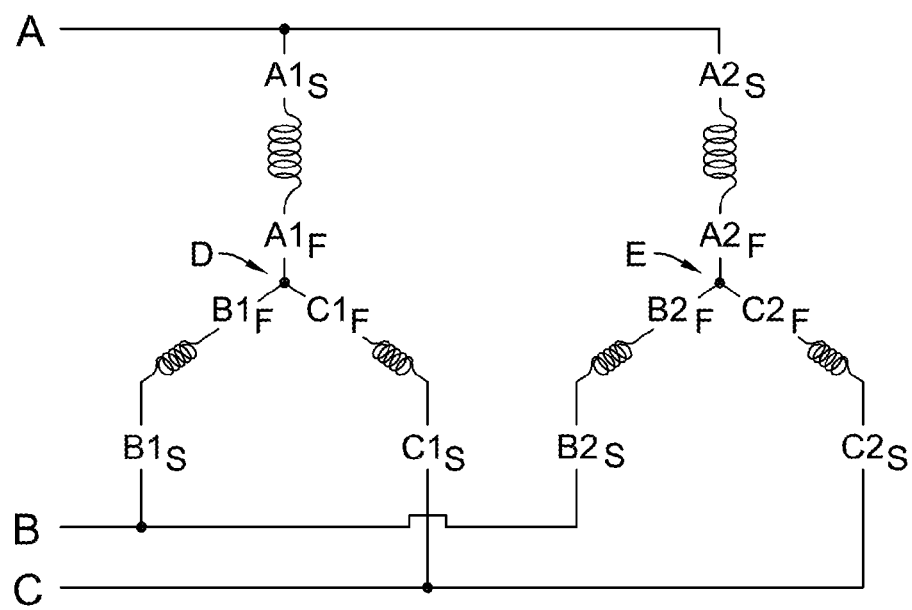
FIG. 8 is a connection diagram for the basic stator assembly shown in FIG. 9.

The paths of each of the six wire leads around stator core 61 is further demonstrated in FIGS. 7 and 8. FIG. 7 represents the stator assembly 60 as a two-dimensional clock-like diagram having twelve equidistant slots labeled numerically, S1 through S12, wherein each slot represents a gap between two stator teeth 41, which in FIG. 7, are labeled T1 through T12 in order to indicate their positions in relation to slots S1 through S12. As shown, lead A1, at A1 Start, enters slot S1 at the top of stator tooth T1, extends downward through slot S1 and wraps under stator tooth T1, passes up through slot S2 between stator teeth T1 and T2, passes over the top of stator tooth T2, then passes down through slot S3 between stator teeth T2 and T3, back under stator tooth T2, and finally back up through slot S2 between stator teeth T1 and T2, to A1 Finish, thereby completing a single winding about stator teeth T1 and T2. To begin the second winding around teeth T1 and T2, lead A1 first passes over the top of stator tooth T1 and then repeats the winding sequence until 14 total wraps are completed, ending at A1 Finish. In such fashion, the three pairs of stator teeth identified as A1, B1 and C1 on FIG. 6 are each wound 14 times in the illustrated embodiment by wire leads A1, B1 & C1 respectively. At the conclusion of these windings, the ends of wire leads A1, B1 and C1, labeled A1 Finish, B1 Finish and C1 Finish in FIG. 7, and labeled $A1_F$, $B1_F$ and $C1_F$ in FIG. 8, are connected and soldered together to form a ground connection labeled as D in FIG. 8.

Just as lead A1 wraps stator teeth T1 and T2, lead B1 wraps stator teeth T9 and T10, and lead C1 wraps stator teeth T5 and T6, the remaining stator teeth are wrapped by leads A2, B2 and C2. However, in this case, as shown in FIG. 7, the leads enter the slot between the two teeth they are to wrap, extend under the first tooth, up through the gap on its other side, over the top of the first tooth and back down through the gap between the two teeth, under the second tooth, and finally up the slot along the far side of the second tooth and back across its top to begin a new winding or exit the winding pattern at A2 Finish, B2 Finish or C2 Finish, as applicable, when a winding is completed. Once again, in the embodiment shown, each pair of stator teeth is wrapped 14 times. In this fashion, lead A2 wraps stator teeth T7 and T8, lead B2 wraps stator teeth T3 and T4, and lead C2 wraps stator teeth T11 and T12. At the conclusion of these windings, the ends of leads A2, B2, and C2, labeled A2 Finish, B2 Finish and C2 Finish in FIG. 7, and labeled $A2_F$, $B2_F$ and $C2_F$ in FIG. 8, are then connected and soldered together to form a second ground connection labeled as E in FIG. 8. As each lead consists of 21 strands, ground connections D and E each join a total of 63 strands in the embodiment shown. The stator windings 66, when completed, preferably receive a protective coating. Though 14 wraps are used in connection with the illustrated embodiment, other numbers of wraps are used in other embodiments as desired to alter the motor characteristics.

Figure 9:
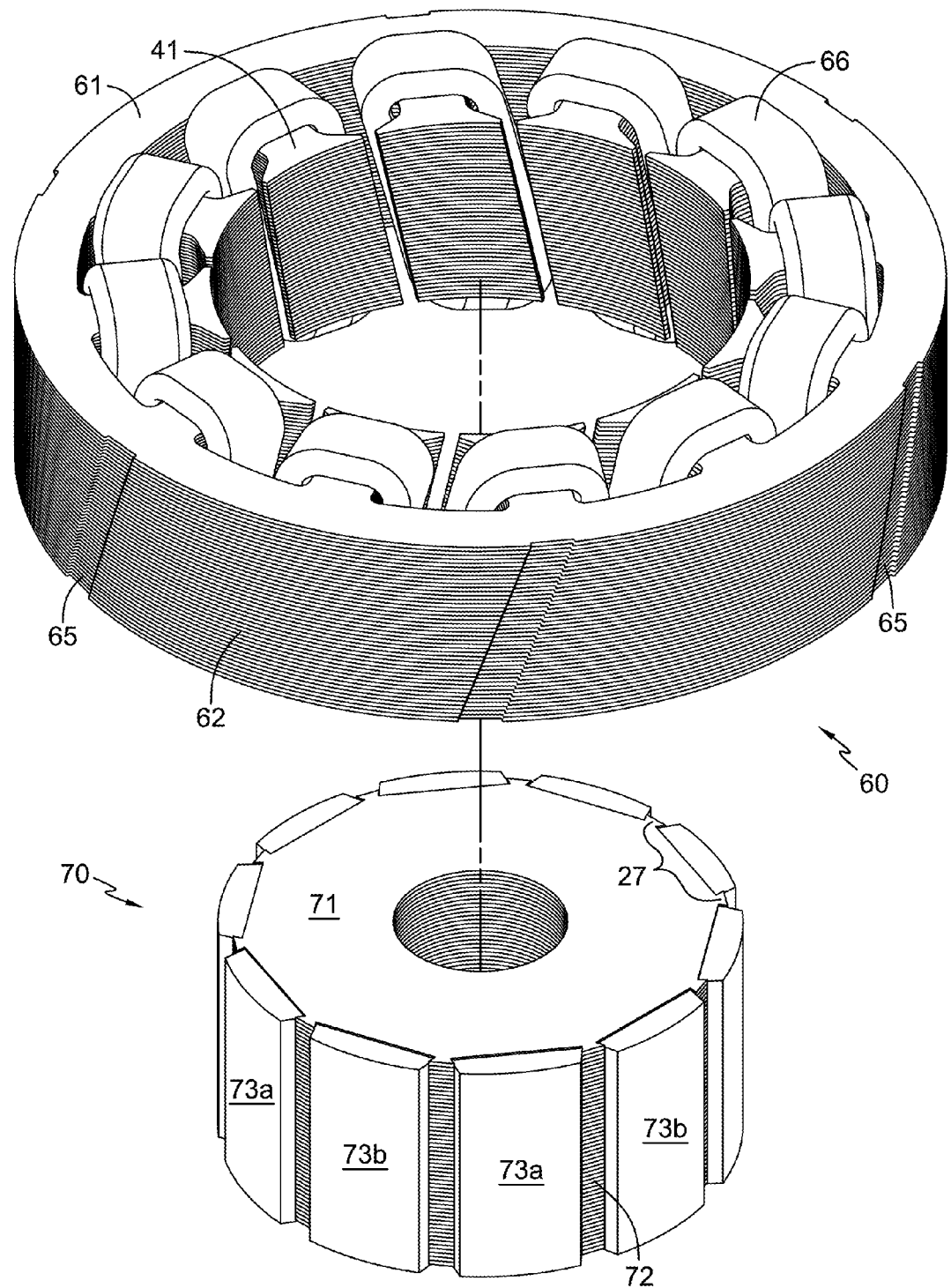
FIG. 9 is a perspective view of the rotor and basic stator assemblies.

Turning to FIG. 9, a simplified perspective view of the stator assembly 60 and the rotor assembly 70 are shown. For instance, the number of laminations illustrated in both the stator and rotor are not significant and details of windings 66 and various electrical connections described previously are not shown. As shown, rotor core 71 and stator core 61 are formed from a plurality of laminations that are individually stamped and then stacked together. The stator laminations 62 are secured together by applying adhesive between each lamination and/or welding along welding slots 65. Rotor laminations 72 are also secured together by applying adhesive between each lamination and/or welding. In the illustrated embodiment, individual stator laminations 62 and rotor laminations 72 are punched from the same stock to reduce material waste. In other embodiments, the stator and rotor cores 61 and 71 are each of unitary construction, created by casting or other known methods in order to provide the basic shape and structural integrity as required. However, using stacked laminations is one practical, known construction method which allows the stator core 61 to take on the skewed shape that is clearly visible in the form of the slanted slots between the stator teeth 41 or in the slanted welding slots 65 along the outside surface of stator core 61. As will be further described below, this skew gives motor 34 certain desirable performance characteristics.

Figure 10:
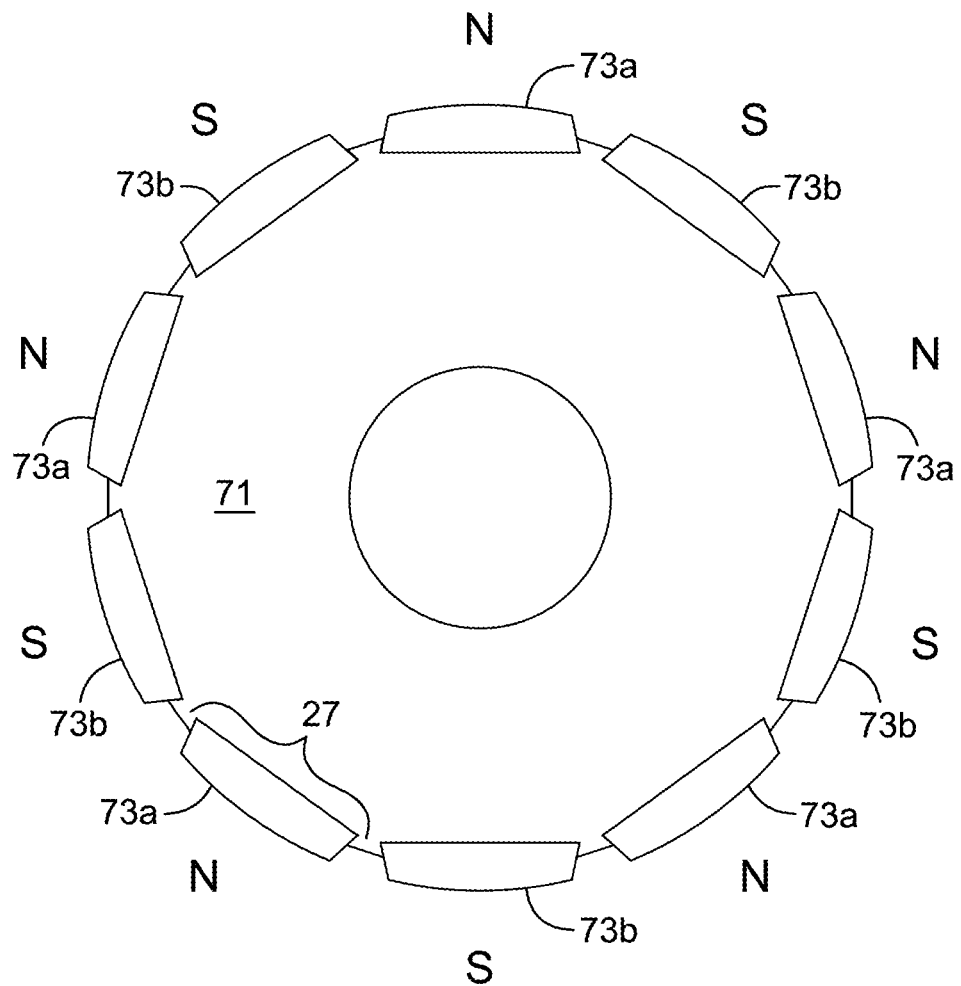
FIG. 10 is a top plan view of the rotor assembly shown in FIG. 9.

Rotor assembly 70 comprises five north polarity magnets 73a, each separated by one of the five south polarity magnets 73b. This alternating polarity arrangement is illustrated in FIG. 10, which provides a top plan view of the rotor assembly 70. In the illustrated embodiment, the ten equally-sized and shaped magnets 73a and 73b are formed from Neo-Boron-Iron (NdFeB) and coated to prevent oxidation. The magnetic flux properties of rotor assembly 70 are influenced by using rotor magnets 73a and 73b with convex faces as illustrated. In addition, the convex outer surfaces of the rotor magnets 73a and 73b help establish a proper airgap between the rotor and stator of motor 34. Electrical current passing through the windings 66 generates a rotating electromagnetic flux field that attracts the rotor magnets 73a or 73b of opposite polarity causing the rotor assembly 70 to turn as current is passed through the windings 66 of the stator assembly 60.

The magnets 73a and 73b are secured to the rotor core 71 using an adhesive, but are also held in place in the embodiment shown by dovetail joints 27 formed in rotor laminations 72. In other contemplated IPM motor embodiments, the rotor construction may utilize magnets having other geometric cross-sections, such as rectangular cross-sections. With rectangular cross-sections, no special magnet surface shaping is required, and the magnets may be installed into rectangular openings in the rotor core. This embedded magnet configuration improves rotor dimensional stability and enables a reduction in the amount of magnet material used while marginally increasing electromagnetic efficiency. In other contemplated embodiments, the shape of the rotor core 71 and rotor magnets 73a and 73b may be modified such that the skew referred to above in relation to the stator core 61 is manifested in the rotor core 71. In still other contemplated embodiments, both the rotor core 71 and the stator core 61 have a skew relative to the axis of rotor rotation.

Figure 11:
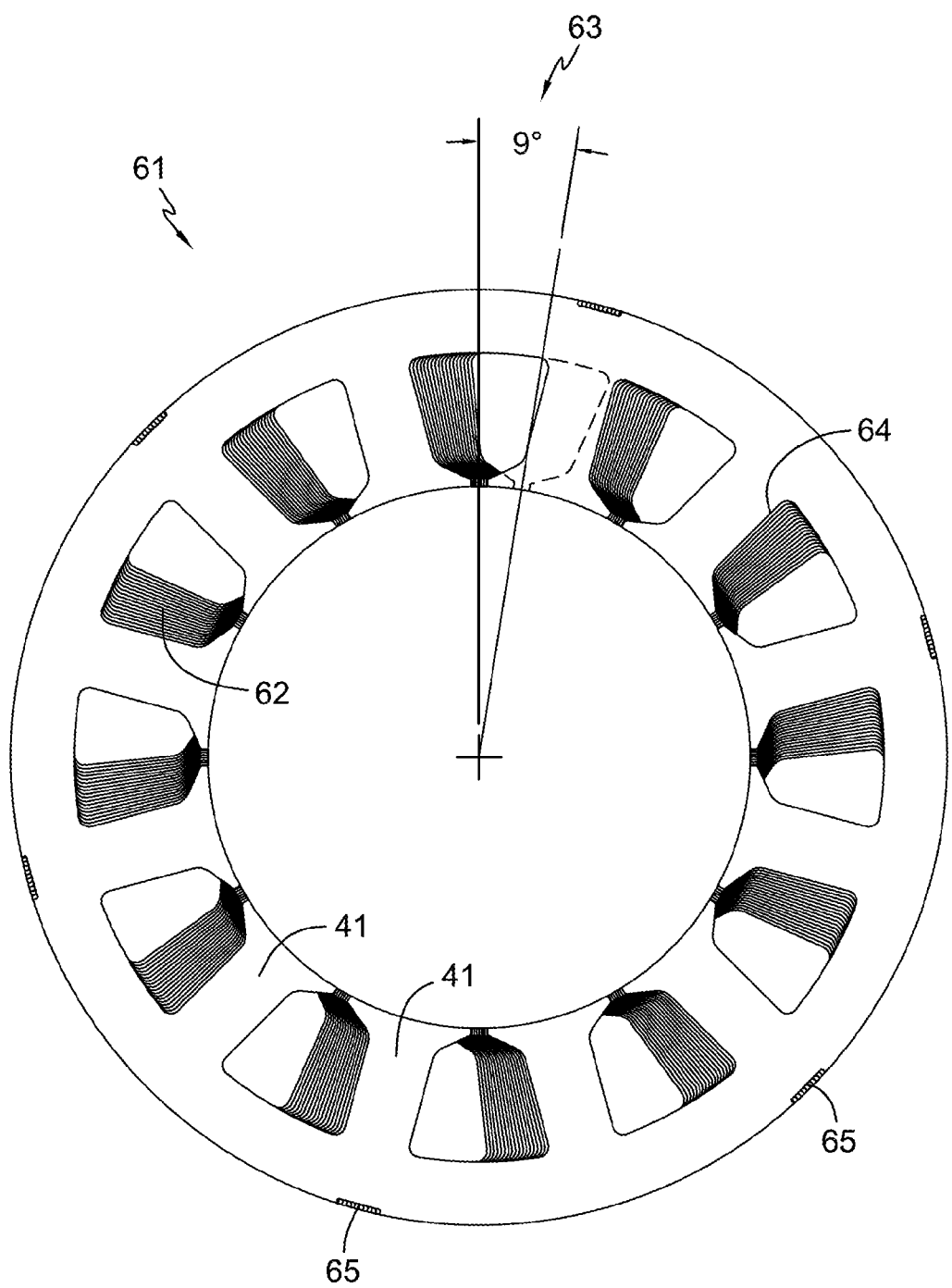
FIG. 11 is a top plan view of the stator core of the stator assembly shown in FIG. 9.

FIG. 11 illustrates stator skew angle 63 of stator core 61. In the embodiment shown, stator skew angle 63 is nine degrees. The skew is clearly visible at the edges of the stator teeth profiles 64 since stator laminations 62 are stacked together and each lamination is rotated slightly in relation to the previous lamination in the stack about a common central axis.

Figure 12:
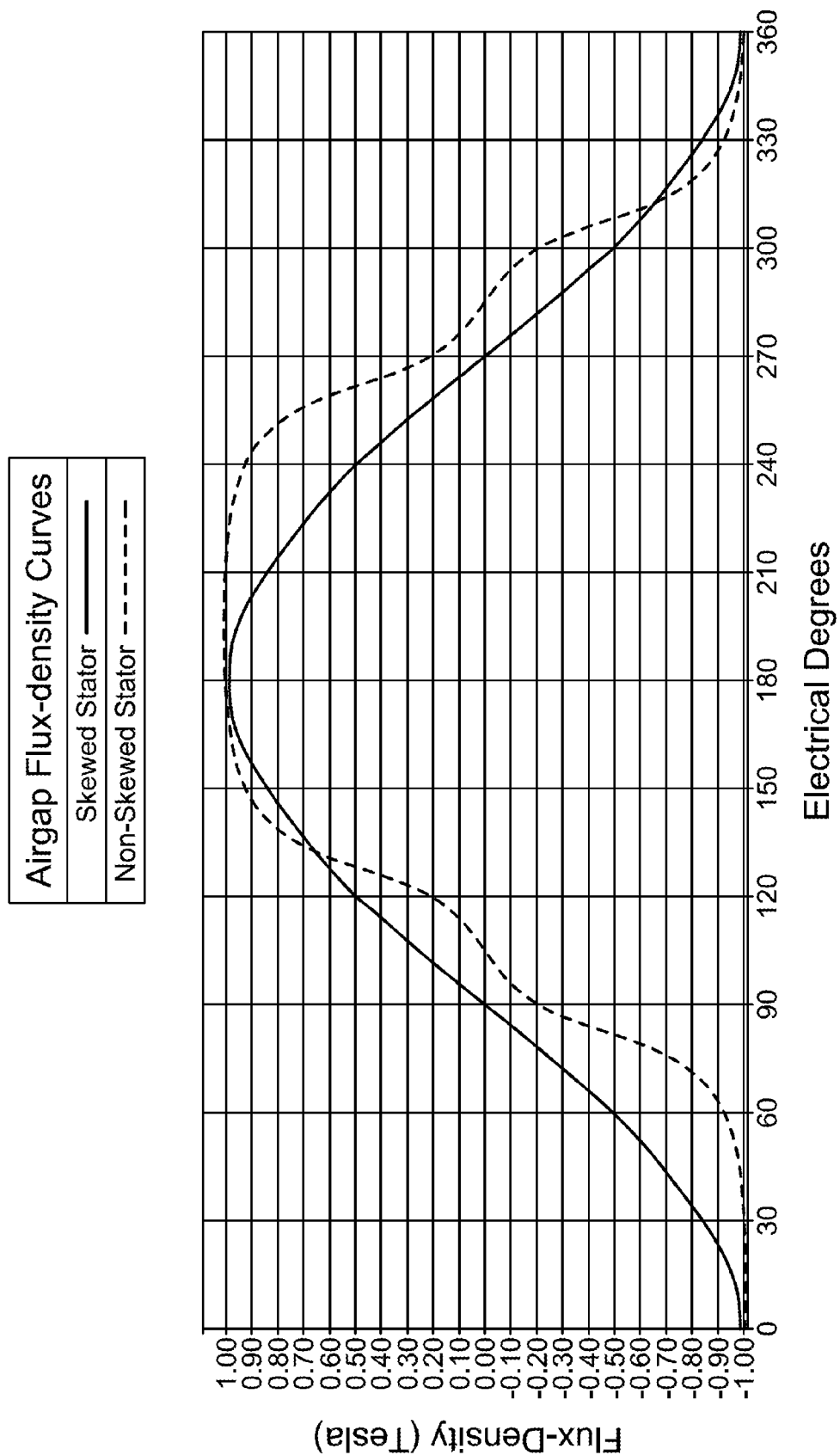
FIG. 12 is a representative diagram of certain electromagnetic flux characteristics of the present invention compared to those of a different configuration.

The nine-degree stator skew angle is used in connection with this embodiment to reduce noise and vibration and improve motor acceleration and deceleration characteristics. In this embodiment, the nine-degree stator skew angle produces a smoother bell curve for airgap flux-density than a non-skewed stator design as rotor assembly 70 rotates inside the skewed stator core 61. Graphically depicted in FIG. 12 are two exemplary airgap flux-density curves which demonstrate the relatively smoother operation of a motor with a nine-degree stator skew versus a motor with a non-skewed stator. The two curves shown indicate flux-density as each rotor turns through 360 electrical degrees, which, in the embodiment shown, is equivalent to a rotor rotation of 72 degrees about its central axis. 360 electrical degrees, or one full electrical rotation, results from only 72 degrees of actual rotor rotation in the embodiment shown because the embodiment contains five north/south polarity magnet pairs (360 divided by 5 pairs=72 degrees). This smoother bell curve translates to a smoother running motor (reduced torque ripple, less cogging motion) as the motor is ramped up to operating speed.

Furthermore, the skewed stator core 61 and/or the convex shape of magnets 73a and 73b as illustrated herein contribute to a back electromotive force (back EMF) with a sinusoidal waveform which enables sensorless speed control of motor 34. Other skew angles are desirable in other configurations or under differing load requirements or operating environments. It will be understood that this invention generally comprises the concept of skewing the stator core relative to the rotor core and is not limited to any particular skew angle. However, high skew angles in the illustrated embodiment can cause the winding process to become quite difficult. Where higher angles are desired, a slotless design (not shown) is used wherein the stator teeth would be inverted so that they point outward and are encased in a sleeve. This embodiment has an advantage where a higher skew angle is desired in that there is more room to insert and wrap the windings around a highly skewed stator tooth profile 64.

Now that motor 34 has been described, it will be useful to illustrate how the mechanical energy it generates is harnessed by a utility vehicle or other power equipment as contemplated herein. As shown in FIG. 5, adapter 13 is secured to motor shaft 20 by a screw or bolt 17 and a washer 16. In this case, bolt 17 and washer 16 also secure a blade 15 (partially shown) by sandwiching it in the joint. Adapter 13 rotates with motor shaft 20 and in relation to the bell nose cone portion 45 of the lower housing 57 in which it is nested. In addition to the use of a sealed lower bearing 78, this nesting further inhibits the intrusion of debris into the motor housing. In other embodiments, other fasteners may be employed. In all embodiments, the joint must withstand the axial and torsional loads that the design may encounter during operation. Furthermore, adapter 13 may be modified in other embodiments to receive a different tool or implement.

Figure 13:
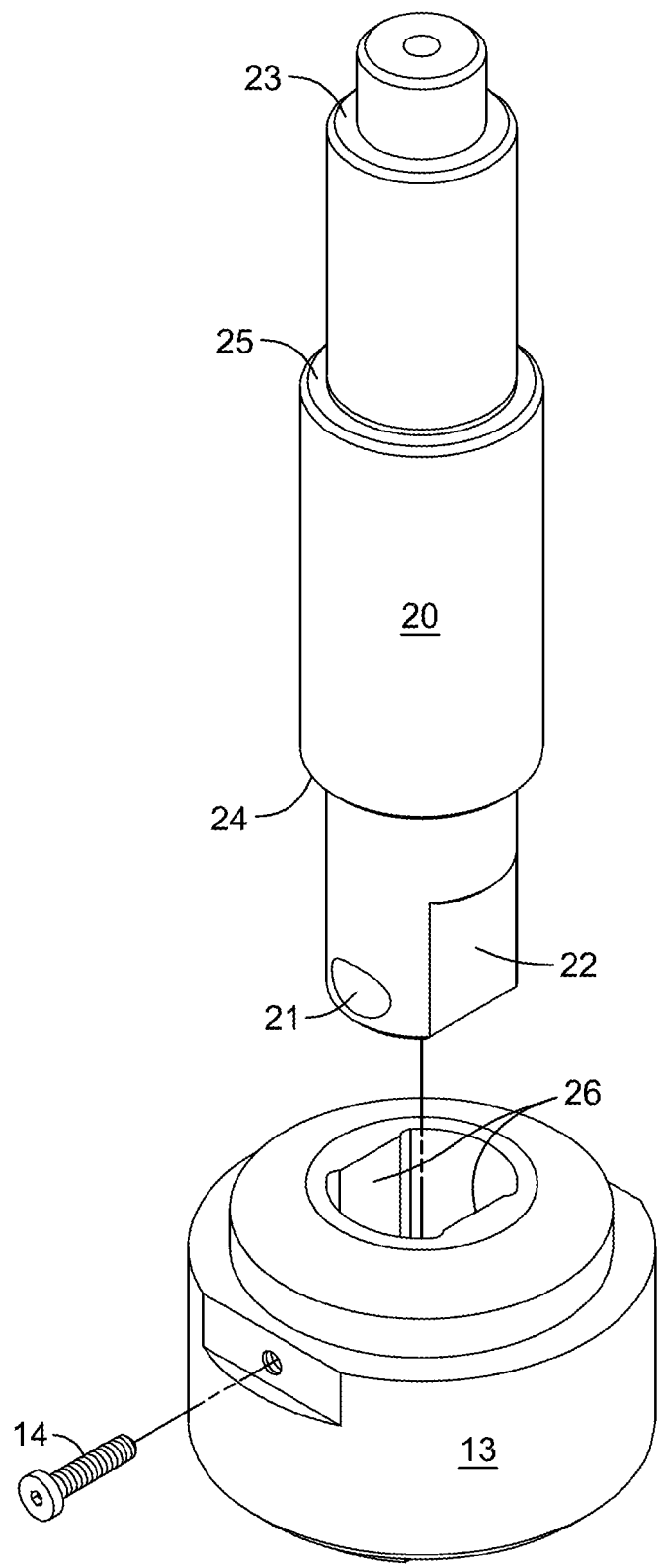
FIG. 13 is an exploded perspective view showing the motor shaft and driven implement adapter.

Though adapter 13 is fixed to the motor shaft 20 as described above, the joint may be enhanced through use of a double-D coupling interface as shown in FIG. 13. In embodiments having such an interface, motor shaft 20 includes two flat surfaces 22 that mate to similar flat surfaces 26 formed in the inside diameter of adapter 13. These surfaces help distribute torsional loads over the relatively large, flat mating surfaces (i.e., motor shaft flat surfaces 22 and hub flat surfaces 26) to provide a longer service life. This provides a robust interface which prevents fretting of motor shaft 20 and adapter 13. As shown in FIGS. 3 and 5, a similar double-D coupling interface, including flat surfaces 18 of adapter 13 and mating flat surfaces on blade 15 (or other implement) is provided in some embodiments to ensure a robust joint between adapter 13 and blade 15 (or other implement). As shown in FIG. 13, a set screw 14, which, when installed, seats in a recess 21 on motor shaft 20, is provided to attach adapter 13 to shaft 20 during shipping and/or during assembly/attachment of an implement such as blade 15 onto shaft 20. Set screw 14 may be removed prior to attaching a blade or other implement, if desired, or left in place to serve as an assembly aid to a manufacturer attaching an implement such as blade 15.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A vehicle, comprising:
    a plurality of vehicle systems comprising a traction system and an auxiliary system;
    a plurality of operator interfaces for operating the vehicle each associated with one of the plurality of vehicle systems;
    a plurality of sensors each associated with at least one of the plurality of vehicle systems; and
    an electric motor control system in communication with the plurality of vehicle systems, the plurality of sensors, and the plurality of operator interfaces;
    wherein the auxiliary system comprises:
        an operable implement; and
        an electric auxiliary motor engaged with the operable implement and in communication with the electric motor control system, the electric auxiliary motor comprising:
            an upper housing;
            a lower housing including a flange for mounting the upper housing thereon and a cone-shaped portion extending away from the flange and the upper housing;
            a stator assembly formed of a first core having a first height and fitted into the upper housing;
            a rotor assembly rigidly joined to a shaft to rotate therewith within the stator assembly, the rotor assembly formed of a second core having a second height; and
            a hub connected to a lower end of the shaft to rotate therewith in relation to the cone-shaped portion, the hub being configured to secure the operable implement to the electric auxiliary motor,
        wherein the second height is greater than the first height.

2. The vehicle of claim 1, wherein the electric auxiliary motor further comprises an upper bearing fitted onto an upper end of the shaft and slip-fitted into an upper cylindrical pocket formed within the upper housing, and a lower bearing fitted onto the lower end of the shaft and slip-fitted into a lower cylindrical pocket formed within the cone-shaped portion.

3. The vehicle of claim 1, wherein:
    the first core is formed by stacking a plurality of first laminations;
    the second core is formed by stacking a plurality of second laminations;
    the plurality of first laminations are skewed relatively to an axis of rotation of the rotor assembly; and
    the plurality of second laminations are skewed relatively to the axis of rotation of the rotor assembly.

4. The vehicle of claim 3, wherein the rotor assembly comprises magnets which extend above and below the stacked plurality of first laminations of the stator assembly.

5. The vehicle of claim 2, wherein the shaft comprises upper and lower shoulders to position the upper and lower bearings, respectively.

6. The vehicle of claim 5, wherein the shaft further comprises a middle shoulder to position the rotor assembly along the shaft.

7. A vehicle, comprising:
a plurality of vehicle systems comprising a traction system and an auxiliary system;
a plurality of operator interfaces for operating the vehicle each associated with one of the plurality of vehicle systems;
a plurality of sensors each associated with at least one of the plurality of vehicle systems; and
an electric motor control system in communication with the plurality of vehicle systems, the plurality of sensors, and the plurality of operator interfaces;
wherein the auxiliary system comprises:
an implement; and
an electric auxiliary motor engaged with the implement and in communication with the electric motor control system, the electric auxiliary motor comprising:
an upper housing;
a lower housing having a flange to sealingly receive the upper housing and an extended portion;
a motor shaft having an end configured to engage an implement adapter, the end configured as a double-D coupling interface, the motor shaft disposed at least partially within the upper and lower housings and supported by the extended portion of the lower housing;
the implement adapter having an end configured to receive the implement, wherein the end of the implement adapter is configured as a second double-D coupling interface;
a stator assembly disposed within the upper housing; and
a rotor assembly engaged to the motor shaft to rotate therewith within the stator assembly.

8. The vehicle of claim 7, wherein:
the double-D coupling interface comprises a pair of substantially flat surfaces for engaging with the implement adapter; and
the pair of substantially flat surfaces form opposite sides of the end of the motor shaft.

9. The vehicle of claim 8, wherein the implement adapter comprises a pair of substantially flat receiving surfaces for engaging with the pair of substantially flat surfaces of the double-D coupling interface.

10. The vehicle of claim 7, wherein the implement comprises a mower blade.

11. The vehicle of claim 10:
further comprising a mowing deck;
wherein:
the flange has a plurality of fastener openings about a circumference of the flange to mount the electric auxiliary motor to the mowing deck; and
the motor shaft and the implement adapter extend through the mowing deck to receive the mower blade.

12. The vehicle of claim 7, wherein the second double-D coupling interface comprises a second pair of substantially flat surfaces for engaging with the implement.

13. The vehicle of claim 12, wherein the implement comprises a second pair of substantially flat receiving surfaces for engaging with the second pair of substantially flat surfaces of the second double-D coupling interface.

14. A vehicle, comprising:
a plurality of vehicle systems comprising a traction system and an auxiliary system;
a plurality of operator interfaces for operating the vehicle each associated with one of the plurality of vehicle systems;
a plurality of sensors each associated with at least one of the plurality of vehicle systems; and
an electric motor control system in communication with the plurality of vehicle systems, the plurality of sensors, and the plurality of operator interfaces;
wherein the auxiliary system comprises:
an operable implement; and
an electric auxiliary motor engaged with the operable implement and in communication with the electric motor control system, the electric auxiliary motor comprising:
an upper housing;
a lower housing including a flange for mounting the upper housing thereon and a cone-shaped portion extending away from the flange and the upper housing;
a shaft having an end configured as a double-D coupling interface;
a stator assembly formed of a first core and disposed in the upper housing;
a rotor assembly engaged to the shaft to rotate therewith within the stator assembly, the rotor assembly formed of a second core; and
a hub engaged to the double-D coupling interface to rotate therewith in relation to the cone-shaped portion, the hub being configured to secure the operable implement to the electric auxiliary motor, wherein the hub has an end configured to receive the operable implement, the end of the hub configured as a second double-D coupling interface.

15. The vehicle of claim 14, wherein:
the double-D coupling interface comprises a pair of substantially flat surfaces for engaging with the hub; and
the pair of substantially flat surfaces form opposite sides of the end of the shaft.

16. The vehicle of claim 15, wherein the hub comprises a pair of substantially flat receiving surfaces for engaging with the pair of substantially flat surfaces of the double-D coupling interface.

17. The vehicle of claim 14, wherein the operable implement comprises a mower blade.

18. The vehicle of claim 17:
further comprising a mowing deck;
wherein:
the flange has a plurality of fastener openings about a circumference of the flange to mount the electric auxiliary motor to the mowing deck; and
the shaft and the hub extend through the mowing deck to receive the mower blade.

19. The vehicle of claim 14, wherein the second double-D coupling interface comprises a second pair of substantially flat surfaces for engaging with the operable implement.

20. The vehicle of claim 19, wherein the operable implement comprises a second pair of substantially flat receiving surfaces for engaging with the second pair of substantially flat surfaces of the hub.

* * * * *